Aug. 16, 1966      A. F. GAUTHIER      3,266,653
KITCHEN UTENSILS
Filed June 29, 1964
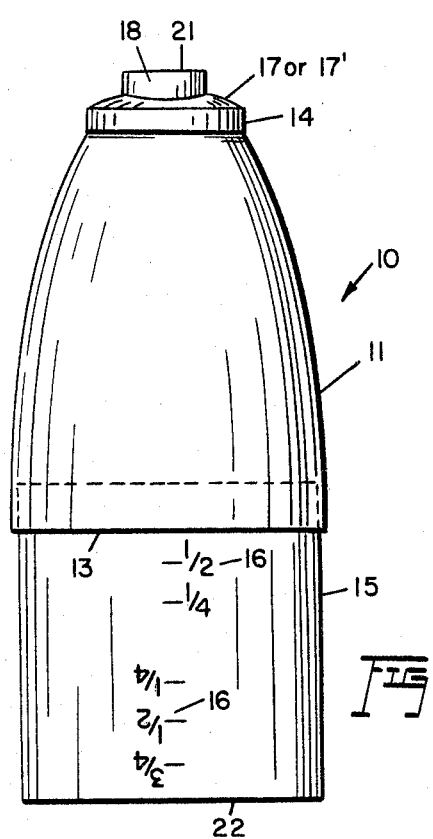
FIG-1-
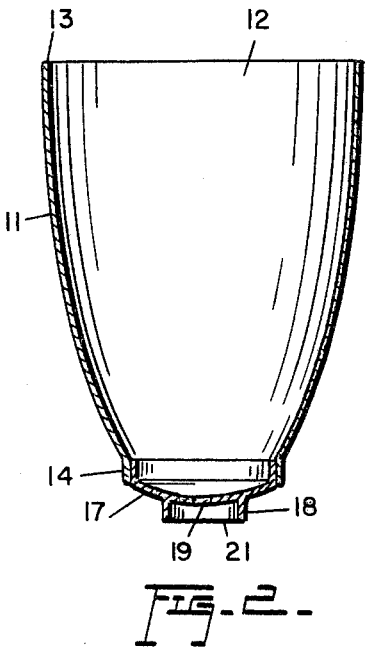
FIG-2-
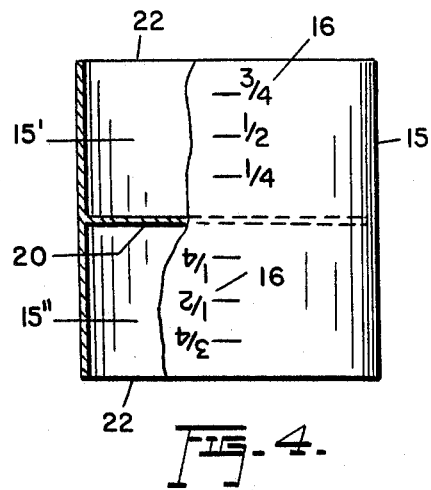
FIG-4-
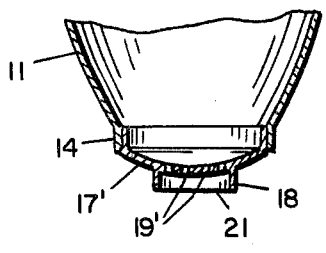
FIG-3-
INVENTOR
ARTHUR F. GAUTHIER
BY  Munson H. Lane
ATTORNEY United States Patent Office 3,266,653
Patented August 16, 1966

3,266,653
KITCHEN UTENSILS
Arthur F. Gauthier, 705 Waverly Place, Melbourne, Fla.
Filed June 29, 1964, Ser. No. 378,903
2 Claims. (Cl. 220—1)

This invention relates to new and useful improvements in kitchen utensils, and the principal object of the invention is to provide a simple, inexpensive and easily manipulable device which may be conveniently and effectively employed for the purpose of performing a variety of different functions.

As such, the utensil of the invention may be used for cutting out cookies of different diameters, for cutting out doughnuts and holes of doughnuts, for separating whites from the yolks of eggs, for sprinkling or condiments, or as a cup measure, a funnel, a cocktail shaker, a formula mixer, a storage vessel, and for various other similar uses.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is an elevational view of the multi-purpose kitchen utensil in accordance with the invention;

FIGURE 2 is a vertical sectional view thereof in condition for use as an egg separator;

FIGURE 3 is a fragmentary vertical sectional view of the device with a modified cap for use as a condiment sprinkler;

FIGURE 4 is a view, partly in elevation and partly in section, of the measuring cup portion of the device.

Referring now to the accompanying drawings in detail, the multi-purpose kitchen utensil of the invention is designated generally by the reference numeral 10 and may be conveniently manufactured from metal, plastic, or any other suitable material.

The utensil 10 comprises a vertically elongated, longitudinally tapered receptacle 11 of a circular cross-section, the same having a relatively large open end 12 defined by the end edge 13 and a relatively small open end defined by an annular rim 14.

A cup-shaped closure 15 is removably telescoped in the large end portion 12 of the receptacle and may be provided with the usual ¼, ½ and ¾ cup markings, as indicated at 16.

A cap 17 is removably telescoped in the rim 14 at the small end of the receptacle and the outer surface of the cap carries an annular neck 18 which is concentric with and of a smaller diameter than the cap itself. The portion of the cap 17 within the confines of the neck 18 is formed with a central opening 19 of a substantially smaller diameter than the neck.

In addition to the cap 17, a second, similar cap 17' is provided, the cap 17' having a group of small sifter or sprinkler openings 19', in place of the single opening 19 in the cap 17. It will be understood that the caps 17 and 17' are usable selectively and individually with the same receptacle 11, either cap being substituted by the other, as the occasion of use may demand.

When the utensil is to be used as an egg separator, the closure 15 is removed from the large end 12 and the cap 17 is applied to the small end of the receptacle 11. The receptacle is held in the position shown in FIGURE 2 and after an egg is dropped into the receptacle, the latter is gyrated in a horizontal plane so that the white of the egg drains through the opening 19 while the egg yolk remains in the receptacle.

The closure 15 is of an open-ended tubular form with a transverse partition 20 which separates the same into a pair of cup members 15' and 15'', the cup markings 16 being provided on both cup members, ascending in opposite directions from the partition 20 so that either of the cup members may be used for measuring purposes when the closure 15 is removed from the receptacle 11.

With either the cap 17 or the cap 17' positioned at the small end of the receptacle, the latter may be used as a funnel. With the cap 17' in place, the utensil may be used for sprinkling of condiments. When the closure 15 is removed, the large end edge 13 of the receptacle may be used for cutting out large cookies or doughnuts, while the end edge 21 of the neck 18 may be used for cutting out small cookies or doughnut holes, either while the cap 17 (or 17') remains applied to the receptacle or after it is removed therefrom. Medium sized cookies may be cut out by the rim 14 after removal of the cap, and with the closure 15 in place at the large end of the receptacle, an end edge 22 of the closure may be used for cookies or doughnut cutting while condiments are retained in the receptacle by the closure, in readiness for sprinkling on the cut dough.

It will be also apparent that with the utensil as shown in FIGURE 1, the device may be used as a cocktail shaker, formula mixer, storage vessel, and the like.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. A multi-purpose kitchen utensil, comprising an open-ended receptacle having a relatively large open end and a relatively small open end, a removable cap provided at the relatively small end of said receptacle, an annular neck of a smaller diameter than said cap provided on the outer surface of the cap concentrically therewith, the portion of said cap within the confines of said neck being provided with at least one opening of substantially smaller diameter than said neck, and a cup-shaped closure removably positioned at the relatively large open end of said receptacle wherein said closure comprises an open-ended tubular body and a transverse partition provided intermediate the ends of said body and separating the same into a pair of cup members.

2. A multi-purpose kitchen utensil, comprising an open-ended receptacle having a relatively large open end and a relatively small open end defined by an annular rim, a removable cap positioned in said rim at the small end of said receptacle, an annular neck of a smaller diameter than said cap provided on the outer surface of the cap concentrically therewith, the portion of said cap within the confines of said neck being provided with at least one opening of a substantially smaller diameter than said neck, a cup-shaped closure removably positioned in the large open end of said receptacle, said closure comprising an open-ended tubular body, and a transverse partition provided intermediate the ends of said body and separating the same into a pair of cup members.

References Cited by the Examiner
UNITED STATES PATENTS 2,500,611   3/1950   Kereluck _____ 220—1
2,752,971   7/1956   Tupper _____ 220—1

THERON E. CONDON, *Primary Examiner.*

LOUIS G. MANCENE, *Examiner.*

J. B. MARBERT, *Assistant Examiner.*